Sept. 5, 1967     W. M. BURNSIDE     3,340,486

GANG TRIP RELAY

Filed Oct. 23, 1965                     5 Sheets-Sheet 1

INVENTOR.
Walter M. Burnside
BY
ATTORNEY.

Sept. 5, 1967  W. M. BURNSIDE  3,340,486
GANG TRIP RELAY
Filed Oct. 23, 1965  5 Sheets-Sheet 3

INVENTOR.
Walter M. Burnside
BY
ATTORNEY.

United States Patent Office 3,340,486
Patented Sept. 5, 1967

3,340,486
GANG TRIP RELAY
Walter M. Burnside, Waukegan, Ill., assignor to Lion Manufacturing Corporation, Chicago, Ill., a corporation of Illinois
Filed Oct. 23, 1965, Ser. No. 503,505
20 Claims. (Cl. 335—166)

This invention relates to electromagnetic trip relays of the gang type which characteristically have several preset, independently-released or tripped contact assemblies adapted to be simultaneously reset by a single electromagnetic resetting means which restores all of them at one time to the latched-up or pre-set starting condition from which one or more of them may be selectively released as the result of the actuation of their corresponding tripping or release coils.

Such relays are useful for controlling large numbers of circuits which must be repetitiously changed and restored to an initial condition, one of the advantages of these devices being that a single resetting means and reset circuit can restore numerous sets of individual trip circuits.

The electromagnetic solenoid is commonly employed as an economical and simple source of driving power for the resetting operation; but this device has the characteristic of developing its maximum effort very near the end of its power stroke and having significantly less drive at the beginning of the stroke, in consequence of which prior solenoid resetting mechanisms have necessarily been overpowered in order to assure a sufficient margin of drive at the beginning of the resetting stroke, and this in turn has been the source of equipment damage and failures because the power at the terminal phase of the solenoid stroke becomes excessive.

In order to compensate for this objectionable characteristic of the solenoid, prior trip relays have tended toward a very heavy construction and to require very wide margins of overtravel both in the contact displacements as well as the driving components.

The presently-disclosed construction provides a highly compact, lightweight, smoothly-operating, easily assembled and serviced unit having a high circuit capacity with excellent switching action and low power requirements for both tripping and resetting operation.

The disclosed construction further affords interchangeable contact units in the form of complete subassemblies which are easily installed, transposed, or removed, and conveniently accessible for contact inspection or adjustment, and which have terminals conveniently exposed for connection.

In addition to the foregoing objects and aspects of novelty and utility, still further advantages and features inherent in the device will appear as the following description of a preferred embodiment thereof proceeds in view of the annexed drawings in which:

Figure 1:
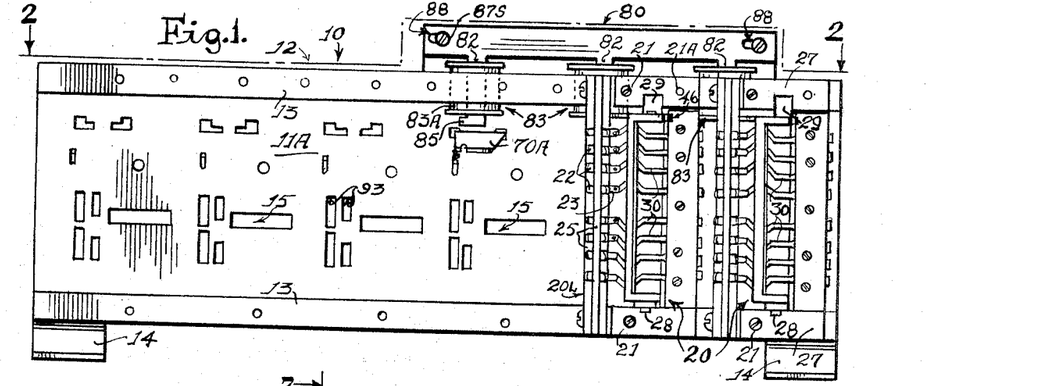
FIGURE 1 is an elevational view of the contact side of the relay with several contact units removed to reveal the chassis structure.
Figure 2:
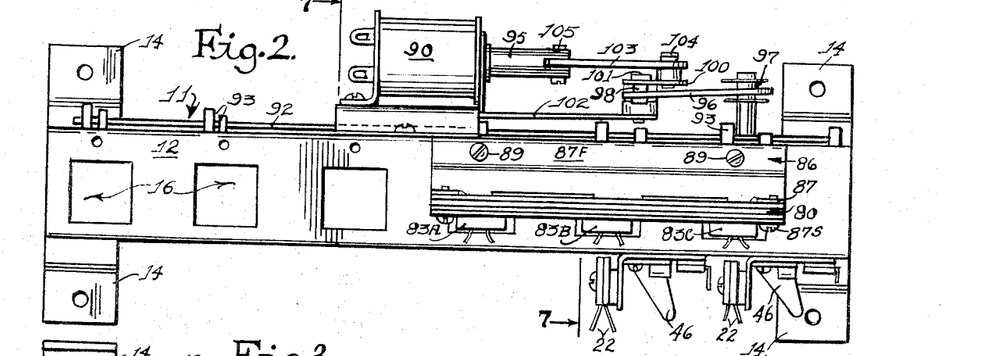
FIGURE 2 is a plan view of the top of the relay seen along lines 2—2 of FIGURE 1.
Figures 3, 4:
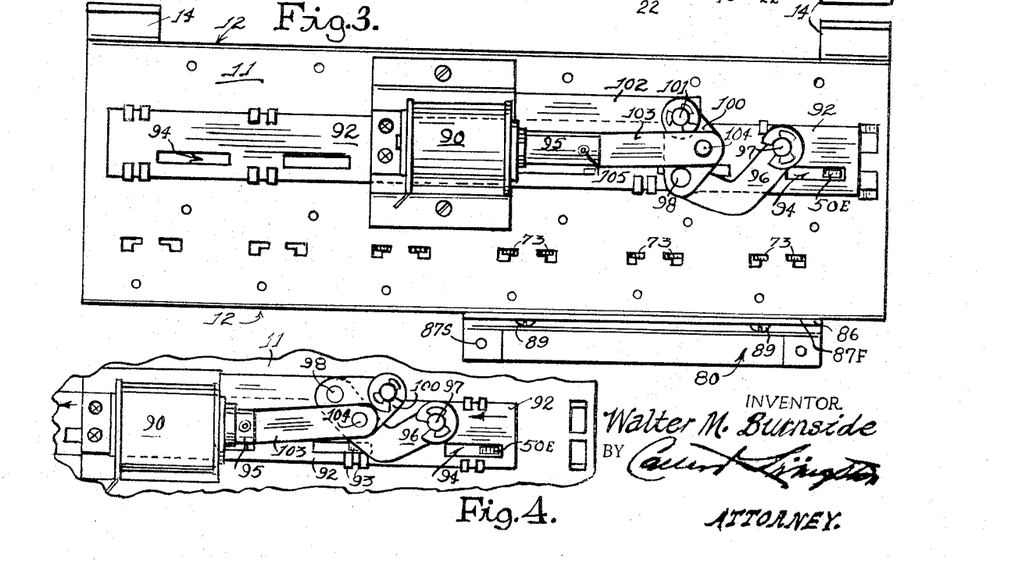
FIGURE 3 is an inverted elevation of the side opposite that shown in FIGURE 1 and depicting the resetting mechanism in normal condition.
FIGURE 4 is a fragmentary plan detail of parts of the resetting mechanism seen in FIGURE 3 but showing the same in operated resetting condition.

In its general organization, the gang relay structure depicted in FIGURES 1, 2 and 3 comprises a chassis 10 on which are mounted three basic subassemblies consisting, first, of a desired number of independently trippable contact assemblies 20; secondly, a corresponding number of selectively operable tripping electromagnets 82; and thirdly, a solenoid resetting mechanism 90-96 etc. common to all of the contact assemblies.

Figure 7:
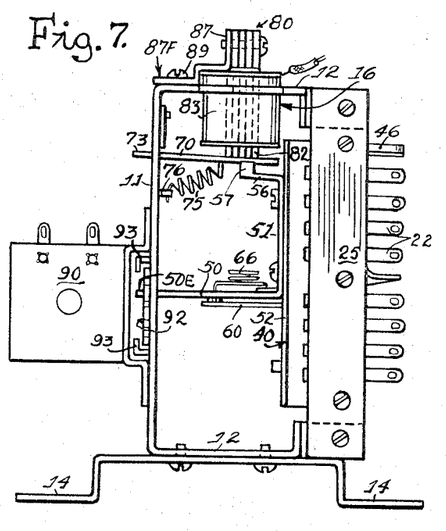
FIGURE 7 is an end elevation of the chassis and components.

Referring to FIGURES 1 to 4, the chassis 10 takes the form of an elongated channel-shaped metal stamping consisting of a main wall plate 11 flanked by opposite upper and lower side walls 12 to one of which are attached leg brackets 14 disposing the chassis on its side with the main plate portion standing in a vertical plane, as in FIGURE 7 particularly.

The long bottom margins of the side walls are struck over to provide parallel mounting flanges 13 on which a desired number of the contact units 20 are removably and selectively located and secured by means of mounting screws 21 and pilot pins 21A engaging in said flanges.

The view of FIGURE 1 is directed toward the inside face 11A of the channel plate, there being shown, however, only two of a possible total complement of six contact assemblies which can be accommodated on the size of chassis illustrated in order to expose to view certain punched seating and mounting configurations for the tripping armatures and the resetting slide to be described more particularly hereafter.

Thus, the space to the left of the contact unit 20L in FIGURE 1 would ordinarily be occupied by at least one additional contact assembly which has been omitted to expose parts of the appertaining electromagnetic trip coil means 83A, and its corresponding tripping armature 70A.

Figures 13, 14:
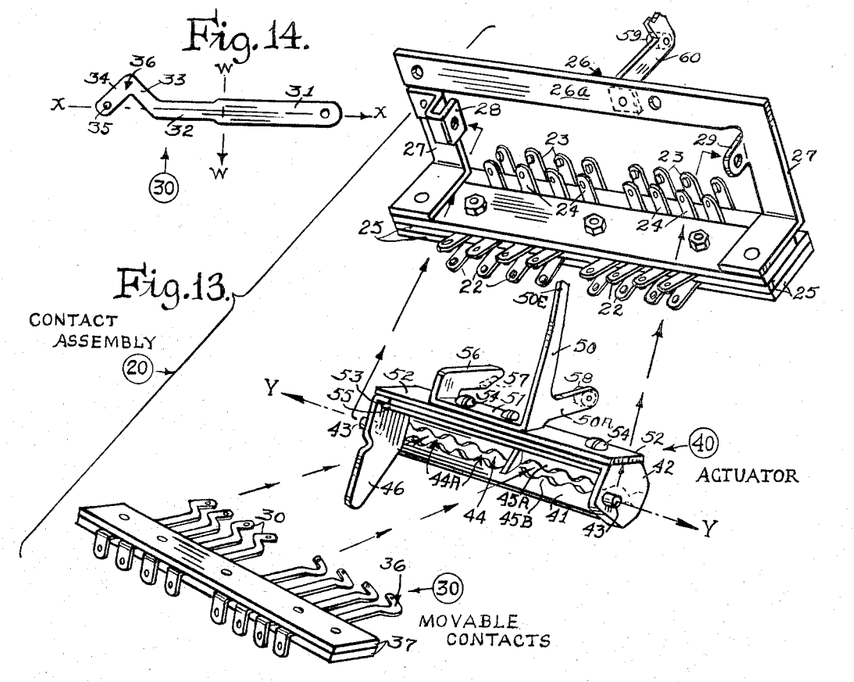
FIGURE 13 is an exploded perspective of one of the contact assemblies.
FIGURE 14 is an enlarged plan detail of one of the special contact blades.

The construction and mode of operation of the individual contact units or subassemblies 20, together with the form and principle of operation of the especially-shaped movable contact blades employed therein, are important to the success of the device, one such contact unit being shown with its parts in disjoined relationship in FIGURE 13 in which are seen a plurality of sets of oppositely-disposed stationary make and break contacts 23, 24 (FIGURE 11 also) with respective lug extensions 22 offset and clamped between insulating strips 25 mounted on a bracket 26.

Figures 5, 6:
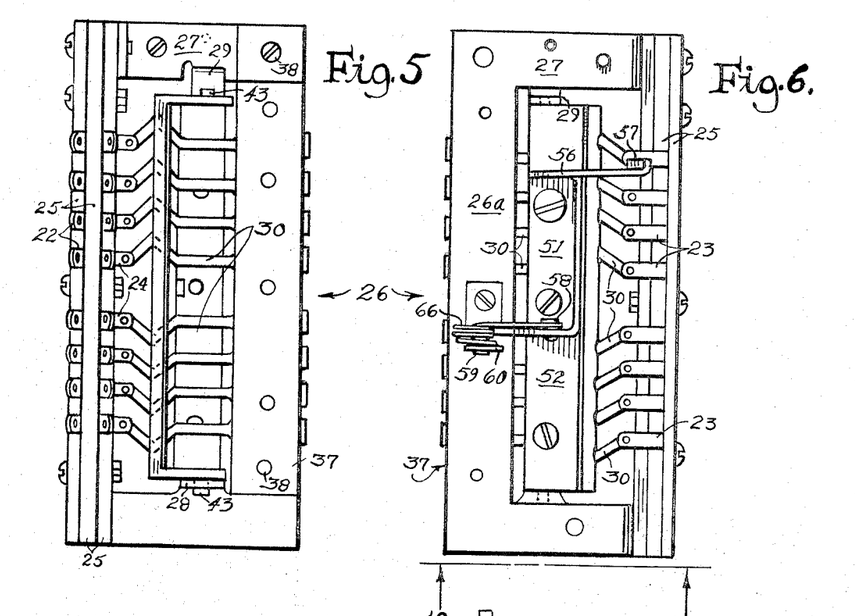
FIGURES 5 and 6 are obverse plan views of one of the contact assemblies.

Opposite side arms 27 on the bracket are provided with aligned pivot-seating members 28, 29 adapted to receive pivot studs 43 at opposite ends of a rockable molded contact actuator 40 which has the function of flexing an entire set of movable contact blades 30 having the special configuration detailed in FIGURE 14, said set of movable contacts being clamped between insulating strips 37 (FIGURE 13) with their respective free-end contact portions extending in between a corresponding pair of the stationary contacts. The clamping array of movable contacts is secured by screws 38 to the cross bar 26a forming part of the bracket 26 (FIGURES 5, 6 and 7).

As seen in FIGURE 14, the movable contact blades 30 are formed of thin springy metal such as Phosphor bronze, and have a particular configuration characterized by a long narrow mounting and clamping shank 31 narrowing into an elongated flexing portion 32 which jogs at 33 near its end region angularly outward from the long major axis X—X extending through said shank, flexing portion, and the contact point 35 at the free end thereof, the first jog 33 turning into a second jog 34 from a point of inflection 36 (FIGURE 15) back toward and continuing slightly across said axis where it terminates, there being a double contact point 35 set in the terminal portion substantially on the major axis.

The change in direction or point of inflection of the jogged portion of the movable contact blades is of particular importance because it is in this region that the blade actuator 40 in its rocking movements will apply to opposite sides of the blades a deflecting pressure with a resultant action at the contact points which is very advantageous, as will appear more fully hereafter.

Continuing with FIGURE 13, the blade actuators comprise an elongated and somewhat scoop-shaped member 40, which may be molded from a synthetic plastic such as Tenite, having a long, thin perforate panel or web 41 flanked by opposite end walls 42 both provided with aligned pivot studs 43 adapted to fit in the aforementioned pivot seats 28, 29 in the contact bracket 26, it being noted that one of the end walls 42 is provided with an integral lever continuation 46 of somewhat triangular shape constituting an auxiliary reset lever for manual engagement.

Figure 15:
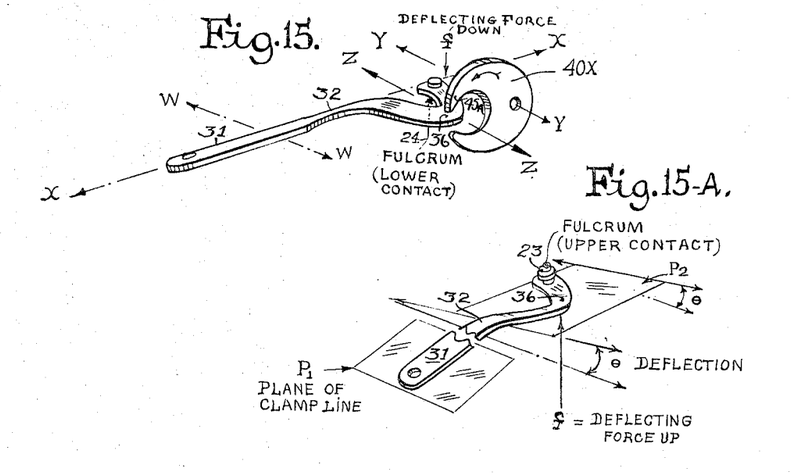
FIGURES 15 and 15-A are enlarged functional schematics illustrative of the deflecting principles of the offset contact blades.

The thin-webbed actuator panel 41 has formed therein a linearly-extending series of contiguous, oblate holes 44 continuously interconnected as at 44A, the confronting margins of these formations affording a continuous series of serrations or undulations defining linearly-successive sets of oppositely-spaced and aligned pairs of contact presser fingers 45A, 45B each adapted to engage the mutually opposite sides of a corresponding one of the movable contacts 30 at the point of inflection 36 thereof, responsive to rocking of the actuator about its axis Y—Y through pivots 43, the axis Z—Z through the length of the web panel 41 between the presser fingers being the common pressure axis and appreciably eccentric of the rocking axis Y—Y (FIGURE 15).

The respective blade actuators 40 for the various contact assemblies will be rocked into latched or pre-set condition by a common solenoid-driven resetting slide and lever system in a manner more fully described hereinafter, it being noted at this juncture only that such resetting is achieved through the reciprocation of a resetting slide 92, which has loose slot-coupled driving engagement with the ends 50E of the several resetting levers 50 of all actuators (FIGURES 3 and 12), said levers each being formed as part of a stamping constituting the latch member, the foot 51 of which is secured upon a long backing plate 52 seated on the outer face of the top wall 53 of the molded piece and secured thereto by screws 54 which engage in a second backing plate 55 on the inner side of said top wall (FIGURE 13).

Figure 11:
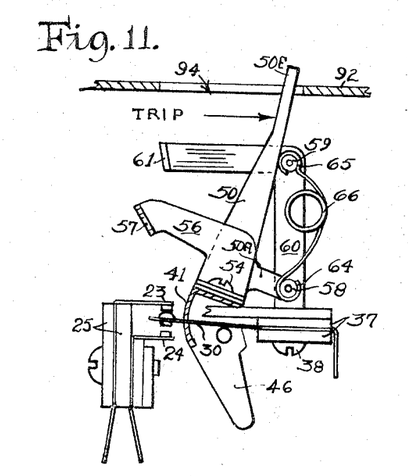
FIGURES 11 and 12 are endwise sectional views of the contact assembly and resetting slide with parts cut away and parts shown in section to depict changed operating and reset positions of the contact actuator as seen from the opposite end of the unit shown in FIGURE 10.
Figure 12:
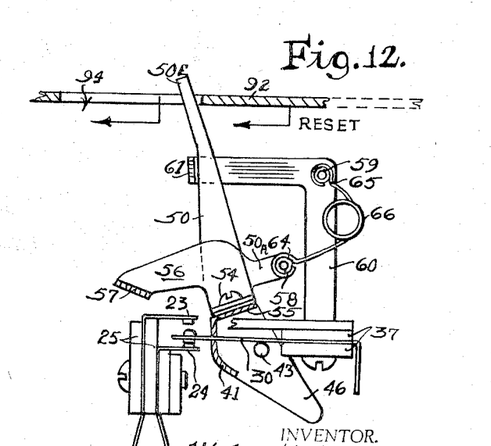

At the opposite end of the latch stamping from the reset lever is a lateral arm 56, one end of which is offset to provide a latching tab 57 adapted to engage the edge of a corresponding latching and tripping armature 70 (FIGURES 7 and 12). A lateral arm 50A on the opposite end of the reset lever is provided with a spring mounting stud 58 on which is pivotally anchored one end 64 of a hairpin type transfer spring 66, the opposite end 65 of which is similarly engaged on another spring stud 59 fixed on a post 60 secured to the bracket member 26a. A lateral extension of this post is provided with an offset stop tab 61 which lies in the path of the reset lever in the direction of its resetting movement to limit the rocking overstroke of the actuator imparted by the action of the solenoid reset slide 92 (FIGURES 11 and 12).

The pivotal attachment of the ends of the transfer spring to the studs 58, 59 are in such a relation, each to the other, to the center of the coil of spring 66, the actuator axis, and the force vectors acting at these points in the opposite movement of the actuator by the blades, that the spring 66 undergoes a translatory movement (compare FIGURES 11 and 12) which permits a predetermined optimum contact pressure in either direction and throws the actuator into the tripped condition, FIGURE 11.

The transfer spring has a neutral or over-center position which is different from the neutral position of the actuator (i.e. with the blades in between the two sets of stationary contacts, engaging neither set). This neutral (or toggle) condition of the transfer spring is reached just after the blades make contact going into the latched condition, the overtravel building up sufficient tension in the springy switch blade to rock the actuator back and carry the transfer spring past its over-center position and cause the transfer spring to throw the actuator the remaining angular distance to the tripped condition, the transfer spring 66 being so named because the trip-out movement of the actuator is transferred from the blades to this spring when the blades have caused enough translation of the transfer spring overcenter to cause it to take over the rocking of the actuator toward tripped position with force enough also to overcome the blade tension in this same direction. The transfer spring must not be permitted to go into toggle in the latched condition.

The particularly advantageous contact action which results from the cooperation of the actuating means 40 and the especially configured blades 30 is further illustrated in view of the schematic diagrams of FIGURES 15 and 15-A, the former depicting a simulated actuator 40X turning counterclockwise about the rocking axis Y—Y so that the upper presser finger 45A bears down upon the jogged offset part of the blade at the point of inflection 36, the first result of this action being to flex the blade until the lower contact 35 bears down upon the lower stationary contact represented by the arrow designated "fulcrum."

The presser finger continues with a certain degree of overtravel after the blade is flexed to engage the lower contact as aforesaid, this stationary contact becoming in effect a fulcrum point for the remaining overtravel movement of the blade, which now tends to twist about its major axis since the point of inflection 36 is radial of this axis and the wide shank 31 of the blade is clamped, while the free end at contact 35 is no longer able to move downwardly under the continuing downward deflecting force occasioned by the overtravel of the actuator.

Thus, during the initial phase of its deflection the blade tends to flex downwardly at the clamp line axis W—W in the manner of an ordinary stack switch blade, but as soon as the free end of the disclosed blade is stopped by the stationary contacts (upper or lower) it begins to twist sidewise as aforesaid and in this second phase of the movement a sort of rolling and sliding action ensues at the contact points causing the movable contact 35 to wipe across the stationary contact with a scraping action that affords good electrical continuity and is self-cleaning. FIGURE 15–A further portrays the second phase of the blade deflection in terms of an upward deflecting force which has twisted the offset part of the blade in an upwardly-deflected plane P–2 making an angle θ with the plane P–1 containing the clamp line axis W—W and the clamped shank portion of the blade, the fulcrum point in this illustration being the upper contact.

The foregoing blade action achieves beneficial electrical and mechanical results with relatively slight displacement of the free end region of the blade. The web 41 of the blade actuator is made quite thin so that the wall thickness at the presser fingers tends in effect to be almost a point-contact type of engagement. For example, in one embodiment, blades of .006 in. thickness are used between opposite presser fingers which are spaced approximately .015 in. apart, the web 41 having an overall thickness of .062 in. tapering, however, almost to a sharpness at the blade-engaging margins of the scalloped series of fingers.

Blade-type switch contacts have been proposed from time to time embodying various offset formations—usually for the purpose of relocating the contact point to a more convenient position, as in telephone relays; or for the purpose of improving the load or modifying the spring rate, examples of prior constructions of this latter type being found in U.S. Patent No. 2,818,481 to Nicolaus and No. 2,775,671 to Dreyfus, both of which disclose the application of deflecting pressures close to the free ends of the blades at or beyond the contact location, as is the case with the usual stack switch blade.

In the arrangement proposed in the Nicolaus patent, for example, the purpose of the offset therein disclosed is to locate the pressure points for all blades in a common load column or line in order to avoid blade collisions in a large stack and to distribute the working load on the electromagnetic actuator more conveniently and more evenly where clapper type armatures are used. In the case of the Dreyfus patent, various peculiar shapes have been imparted to the contacts therein disclosed to facilitate locating the same in a circle about a common central actuator, and to produce desired spring rates as well.

Unlike prior offset blades, the presently-described contact blades and the actuating means therefor embody principles which result in a complex displacement of the contact point itself at the free end of the movable blade in which the blade in quick succession flexes up and down relative to a lateral axis and also twists about its longitudinal axis, there being a positive and liberal range of overtravel to the deflection after the first engagement of the moving contact point with the stationary fulcrum point. The amount of overtravel which can be tolerated by the new blade without objectionable stressing is very great in comparison with ordinary stack switch blades, because the deflecting force is applied a substantial distance at one side of the long blade axis at a point between its ends, and because the force is applied to the junction (point of inflection) of two short lateral blade sections (the jogs) which are themselves sufficiently yieldable to absorb or dissipate the effects of any overstroke of the actuator and prevent deforming the blade or imparting a set thereto.

Figure 8:
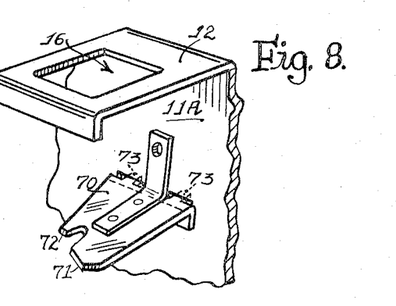
FIGURE 8 is a fragmentary perspective detail, to enlarged scale, of parts of the chassis and one of the tripout armatures.
Figure 9:
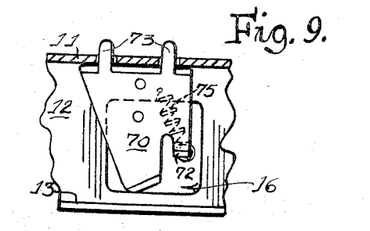
FIGURE 9 is a fragmentary elevational detail of the armature structure seen in FIGURE 8.

Means for releasably latching the individual actuators 40 in set condition comprises an armature 70 (FIGURE 7) in association with each contact unit and having the configuration seen in FIGURES 8 and 9 with pivot tabs 73 seating in slots 74 located along the chassis plate 11 at one side of the appertaining contact unit to dispose the armature in alignment with the corresponding latch arm 56, as in FIGURE 7.

Upper edge portions 71 of the armature are slanted at an angle corresponding to that of the latch tab 57 (FIGURE 12) such that when the actuator moves into the reset position, as in FIGURE 12, the armature will snap back with said slanted edge 71 thereof caught beneath the latch tab thus preventing the actuator from springing back to tripped condition (FIGURE 11). Another edge portion of the armature adjacent the slanted latching margin is notched to provide a lug 72 to which one end of the armature return spring 75 is attached, the opposite end of this spring being engaged with another lug 76 struck up from the chassis plate (FIGURE 7).

Each contact assembly is provided with its own latching armature, but the electromagnets or coils 83 for selectively attracting the several armatures from latched to tripping position are ganged in sets of two- and three-coil units in order that even and odd numbers of coils and contact assemblies may be optionally provided on the chassis.

Figures 16, 17, 18:
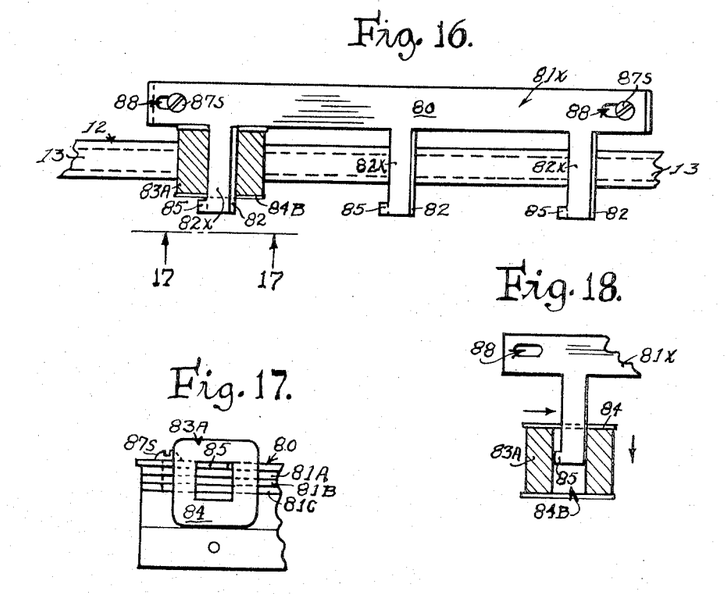
FIGURE 16 is an enlarged plan view of parts of one of the gang tripping electromagnet units.
FIGURE 17 is a fragmentary end view of the pole face of a tripping electromagnet, viewed along lines 17—17 of FIGURE 16.
FIGURE 18 is a fragmentary sectional detail of the electromagnet shown in FIGURES 16 and 17.

A ganged three-coil trip magnet assembly is shown in FIGURE 16 and is substantially identical to that described and claimed in my copending application, Ser. No. 483,582, filed Aug. 30, 1965, and comprises a stator or field core assembly consisting of an elongated stator bar 80 formed of a stack of several matching laminations 81a, 81b, 81c, from each of which are laterally projected a plurality of pole legs 82 respectively adapted to receive a corresponding magnetizing coil 83A, 83B, 83C, wound on bobbins 84 each having a bore 84B to fit upon a pole leg.

The gang stator or core assembly includes a special coil-locking lamination 81X which differs from the remaining laminations of the stack in that a short coil-locking projection or tooth 85 is provided at one side of the salient pole face at the free end of each leg 82X, and said legs are slightly smaller in width than the legs 82 of the regular laminations in order that the legs on the locking laminations may simultaneously be shifted laterally within the bores of the coils from the locking position shown in FIGURES 16 and 17 to the coil-releasing position seen in FIGURE 18 which permits any coil to be installed or removed.

Figure 19:
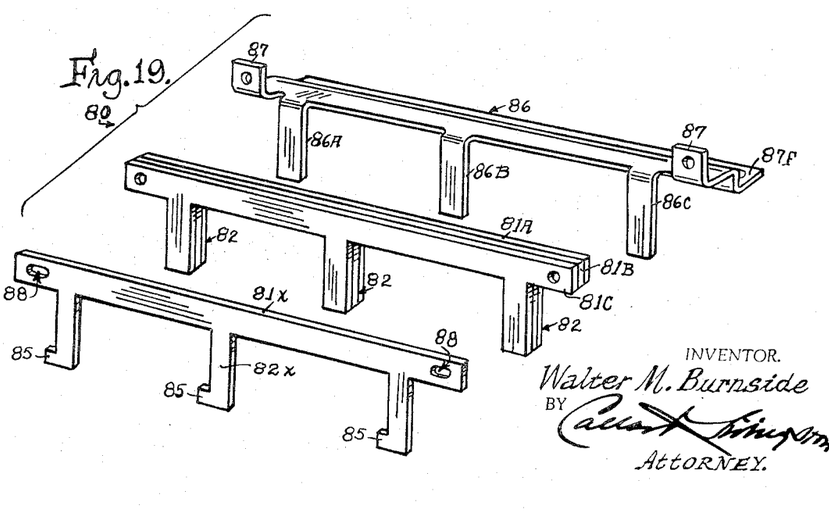
FIGURE 19 is an exploded perspective to enlarged scale of the coil-locking electromagnet field frame shown in FIGURE 16.

The stack of stator laminations is assembled with a mounting lamination (FIGURE 19) comprising an elongated bar portion 86 from which pole legs 86a, 86b, 86c project for alignment with the pole legs of the other laminations, there being a pair of lugs 87 struck up from the opposite ends of the mounting bar with tapped holes to receive mounting screws 87S, as in FIGURE 16. The locking lamination is provided with elongated holes 88 for said mounting screws, thereby permitting the aforesaid lateral shifting movement of the locking lamination necessary to free or lock the coils. A further offset 87F on the stator bracket provides a mounting flange adapted to seat upon one of the side walls of the chassis, as in FIGURES 1 and 7, where it will be removably secured by screws 89.

A copending application Ser. No. 483,582 describes the construction, operation and advantages of the gang coil structure more fully.

Referring to FIGURES 2, 7 and 8, the aforesaid gang coil assemblies are mounted on one of the side walls of the chassis by means of the flange 87F on the bracket lamination and screws 89 (FIGURE 7), the several magnetizing coils 83A, 83B, 83C and their respective pole legs 82 each fitting into a corresponding one of the coil windows 16 in said side wall with the pole faces of each leg disposed in operative juxtaposition with a corresponding latching aramature, as in FIGURE 7, which shows the armature 70 attracted toward pole piece 82 with the corresponding actuator latch tab 57 disengaged by the armature.

The resetting mechanism is mounted on the outer face of the main chassis plate (FIGURES 2 and 3) and comprises a solenoid 90 and a special, ratio-changing lever means for reciprocating a long actuator-resetting slide bar 92 extending nearly the length of the chassis and slidably secured beneath a plurality of overlying hold-down tabs 93 punched up from the chassis plate and turned over to define a slideway for said bar.

The resetting solenoid includes the usual plunger 95 normally urged outwardly of the solenoid bore by spring means therein (not seen) and connecting with a link in a ratio-changing lever system contrived to reduce the velocity of the resetting slide 92 toward the end of the plunger stroke in order to eliminate damaging override and the terminal hammer-blow and attendant wear on moving parts heretofore commonly experienced with ordinary resetting arrangements of this type.

The special ratio-changing linkage comprises an offset or dog-leg lever 96 pivoted at one end 97 on the reset slide 92 and having a pivotal connection 98 at its opposite end with a smaller angular lever 100 which in turn is pivoted at 101 on a plate 102 which may also form part of the solenoid mounting. A solenoid drive link 103 has a pivotal connection 104 with said smaller angular lever 100 at a point between the first-mentioned pivotal connections 98 and 101 therewith, said drive link connecting at a pivot pin 105 with the solenoid plunger 95.

When the solenoid is first energized its plunger 95 moves inwardly with relatively low energy but starts the smaller angular lever 100 which in turn pulls on the dog-leg lever 96 to slide the reset bar 92 toward the left, the two angular levers 96 and 100 meanwhile shifting their respective pivotal relationships as the plunger and link 103 continue leftward in the driving stroke, in such manner that substantially the entire starting force of the solenoid plunger is exerted initially on the slide 92 at the beginning of the stroke; but as the plunger moves farther toward its fully-attracted inward limit, the magnetic pull accelerates very rapidly toward a maximum; however, this increasing non-linear force will be proportionately slowed and diminished in transmission to the slide bar owing to conversion by the progressive change in lever ratios effected by the aforesaid shifting of pivotal centers of the angular levers 96, 100, so that at the end of the plunger travel, the system is effectually in toggle and the applied driving force approaches zero or an optimal low terminal value calculated to eliminate override and the troublesome hammering action characteristic of prior devices, the relative relationships of the aforesaid pivotal centers at the initial and terminal phases of the plunger stroke being respectively depicted in FIGURES 3 and 4.

The reset slide bar 92 is provided (FIGURE 3) with a series of spaced-apart longitudinally-extensive coupling slots 94 which register with similar slots 15 punched through the main chassis plate (FIGURE 1), the slots in the slide bar each being adapted to receive freely the upper end portions 50E of corresponding actuator reset levers 50 projecting up through the chassis slots 15 from the several contact assemblies for resetting movement in the manner illustrated in FIGURES 11 and 12, the power stroke advance of the resetting slide 92 toward the left in FIGURE 12 serving to rock all of the levers 50 from their tripped-out condition, as seen in FIGURE 11, toward the latched-up reset condition of FIGURE 12, responsive to energization of the resetting solenoid 90.

The lever system may and usually does move beyond the toggle state, in which case the slide 92 merely backs up slightly after latching the resetting levers.

*Operation*

Figure 20:
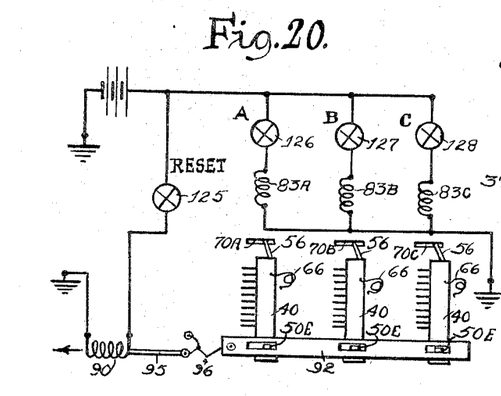
FIGURE 20 is a schematic functional and circuit diagram.

The operation of the relay is summarized in view of the functional circuit diagram of FIGURE 20 wherein it may be assumed that the reset switch 125 is closed to energize the resetting solenoid 90, the result of which will be a shifting of the long reset slide 92 toward the left (FIGURES 2, 3, 4) so that the reset levers 50 of whichever of the contact assemblies 20 happen to be in tripped condition (FIGURE 11) will be rocked toward the left to their respective reset conditions (FIGURE 12) in which they will be again latched up by their corresponding armatures 70, etc., as heretofore described in detail.

Figure 10:
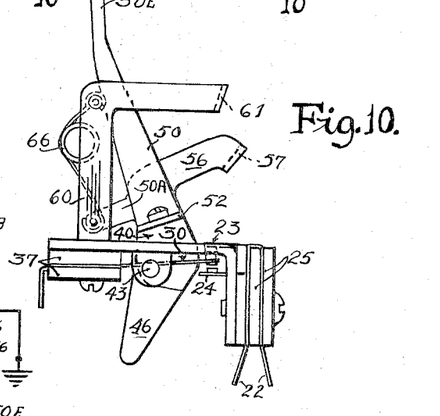
FIGURE 10 is an enlarged end view of one of the contact assemblies looking in the direction of lines 10—10 of FIGURE 6.

Thus, any or all of the rockable contact actuators 40 which may have been tripped out, will be simultaneously restored to the reset condition. Closure of any of the selective trip switches (A, B, C) 126, 127, 128 will effect energization of a corresponding one of the trip coils 83A, 83B, 83C thereby disengaging the corresponding armature from its holding or latching engagement with the appertaining actuator, the transfer spring 66 of which (FIGURES 10–12) aids rocking such actuator back again to the tripped, change-circuit condition (FIGURE 11) causing the movable contact blades 30 to shift from the condition of FIGURE 12 to that of FIGURE 11; the transfer spring means in this operation exerting a predetermined optimal torque effort on the actuator after start of the rocking trip-out action which is carried through to effect positive overtravel at the end of this movement, the applied force nevertheless being automatically decreased to a predetermined lower value which is empirical depending upon the blade parameters as to number, size, thickness, material, etc. with the object that the terminal effort will be sufficient to ensure good contact pressure consistent with minimal loading of the solenoid resetting means after the several blade actuators 40 come to rest.

Should one of the trip coils 83 burn out, or otherwise become defective, a new coil may be substituted quickly by removal of the unit and loosening of the mounting screws 87S followed by shifting of the locking lamination 81X to the condition of FIGURE 18 and withdrawing the defective coil from the pole leg after disconnecting the leads to the coil terminals.

Likewise, trouble arising in the contact units may be quickly corrected by removal of the defective unit and substitution of another, which involves only removal and replacement of the two screws 21 (FIGURE 1). Once removed, such contact assembly may be easily examined and disassembled for inspection or minor adjustments not requiring replacement.

The solenoid resetting means requires minimal attention owing to provision of the ratio-converting drive linkage, which eliminates a major source of trouble heretofore experienced with prior resetting mechanism by automatically compensating for the non-linear driving force of the solenoid, it being observed further that the coupling interconnection between the common reset slide 92 and the several resetting levers 50 is impositive and disjunctive in the sense that any reset lever may be uncoupled simply by lifting the appertaining contact unit from its seat on the chassis, thus withdrawing the levers 50 from the coupling slots 94 in slide 92.

Thus, the reset lever linkage changes the driving ratio of the system to decrease the velocity of the slide 92 so that it slows to a stop by the time the plunger stroke is completed, the system being permitted to go beyond toggle in this direction, since this merely backs up the slide in the direction of its intended return movement with no possible damage to the leverage or contact means.

I claim:
1. Switching means comprising, in combination: a plurality of contact units each comprising a plurality of flat elongated flexible contact blades each fixed at one end region in a clamp plane in a side-by-side array to extend in parallelism and lie normally in a common reference plane relative to which the blades may be flexed in unison oppositely from said plane and move the opposite free end portions thereof in contacting action; each blade having a long median reference axis extending from the free end thereof into the clamping plane, and blade contact means on opposite sides of the free end and lying substantially on said axis; stationary contact means on opposite sides of the free end portion of each blade for engagement alternately by the blade contact means responsive to opposite flexures of the blade; actuator means for flexing the blades oppositely in unison; a single electromagnetic reset means common to all contact units and having driving connection with the respective actuator means thereof for moving the latter in one direction to a first switching position; releasable latch means acting auto- matically to latch said actuator means in said first switching position; and individual electro-mechanical trip means for each contact unit and each having operative connection with the appertaining actuator means for action to effect release of the appertaining latch means and movement of the actuator means in the opposite direction to a second switching position provided the actuator means is latched in the first switching position.

2. Switching means according to claim 1 wherein said contact blades each have a projection extending laterally from said axis in the plane of flatness, and said actuator means in the opposite flexing actions thereof engages only the lateral projection of the blade.

3. Switching means according to claim 1 wherein said contact blades each have a projection extending laterally from said axis in the plane of flatness, and said actuator means in the opposite flexing actions thereof engages only the lateral projection of the blade, and said stationary contact means is spaced from the corresponding blade contact means a distance such that each blade moves substantially in an arcuate path about a transverse axis approximately parallel to the clamp plane until one of the stationary contacts is engaged, and the blades thereafter continue in further deflection in an approximately twisting movement about said blade axis with the interengaged blade contacts and corresponding stationary contacts acting as a fulcrum with respect to which such further deflection is effected.

4. Switching means according to claim 1 wherein said actuator means is in the form of a unitary member of elongated configuration and supported for rocking movement at its opposite ends to rock about an axis transverse to the blades and approximately in parallelism with said reference plane, said member having a web portion paralleling its rocking axis, and provided with a linear series of openings through respective ones of which one of said contact blades projects at a point adjacent the respective free ends thereof, said holes having marginal portions defining opposite presser fingers in pairs respectively engageable with the appertaining sides of the corresponding contact blade to engage the opposite sides of the latter alternately in blade-deflecting action responsive to rocking of the actuator member.

5. The construction of claim 4 wherein each contact blade has a jogged extension disposed laterally of its axis but in the plane of the blade, said extension being directed outwardly of said axis and being returned at a region of inflection back toward said axis, and each of said pairs of presser fingers of the actuator member being disposed in juxtaposition with the point of inflection of the appertaining blade to engage the latter thereat in deflecting action as aforesaid.

6. The construction of claim 5 further characterized in that the stationary contacts for each blade contact are so spaced apart, and the angular displacement of said actuator member is of such magnitude in both directions of rocking movement that the contact blades are first flexed into engagement with one or the other of the corresponding stationary contacts during an initial phase of rocking movement of the actuator member in either direction, and upon establishing contact in such direction the actuator member has a degree of overtravel in such direction which imparts a continuing deflection of the blade which is mainly a twisting action about the blade axis.

7. Switching means according to claim 1 wherein the actuator means for each contact unit comprises a rockable member mounted to rock about an axis lateral to the contact blades and approximately parallel to the reference plane thereof, and said contact units are mounted in series alignment with the rocking axes of their respective rockable actuator members in parallelism and approximately in the same plane one with another, and said electromagnetic reset means comprises a slidable member extending in a direction across the respective rocking axes of the several contact units, an electromagnetic solenoid having a bore with its axis approximately paralleling the sliding axis of the slidable member, a solenoid plunger movable in the direction of said bore; linking means drivingly interconnecting said plunger and slide for movement of the latter by the plunger attracted by the solenoid.

8. Apparatus according to claim 7 wherein said linking mechanism comprises two angular levers and a link pivotally interconnected to change leverage ratio in proportion to the advance of the plunger and beginning each resetting movement of the slide with a maximal effort and terminating the resetting advance of the slide with a lesser effort near the end of the plunger advance.

9. A contact structure comprising opposite stationary contacts in pairs said pairs arranged in a linear series; elongated blade contacts also arranged in a linear series paralleling said first-mentioned series, and means clamping the blade contacts at one end with respective free contact ends disposed between a corresponding pair of said stationary contacts for flexing action into and out of contacting engagement therewith; and means for flexing said blade contacts in unison comprising an elongated actuator mounted to rock about an axis parallel to a reference plane containing said linear series, said actuator including opposite presser fingers in sets each confronting an opposite side of one of said blade contacts for movement into engagement with the respectively corresponding sides of the appertaining blade contact to deflect the latter oppositely responsive to correspondingly opposite rocking movements of the actuator; and means for rocking the actuator oppositely as aforesaid.

10. Apparatus according to claim 9 wherein said blade contacts each extend for the major portion of their length along a major axis at one end of which is a flat clamping area, and at the opposite end of which is the free contact end of the blade, the free contact end of each blade being provided with a contact area lying substantially on said axis, each blade having a lateral offset portion projecting angularly from said axis at a point between the free and clamped ends thereof, said actuator presser fingers being disposed in each said set to engage correspondingly opposite sides of the appertaining blade contacts in the region of said offset portions thereof whereby to apply opposite flexing and deflecting pressures to the blade contacts at a point lying at one side of said major axis.

11. Apparatus according to claim 10 wherein said means for rocking the actuator effects a predetermined overtravel thereof in both directions and therefore also of the presser fingers in both directions to a degree continuing deflecting pressure on the blade in either direction after engagement thereof with either of the corresponding stationary contacts, whereby to impart a sort of twisting displacement of a portion of the blade about said major axis with resultant relative movement between the blade contact area and the stationary contact engaged thereby following initial contacting engagement therebetween.

12. In a gang relay, a plurality of elongated blade contacts fixed at one end side-by-side to lie in a common reference plane with free contacting end portions movable in opposite directions along arcs cutting such plane normally, each said end portion having a contact element exposed on both sides thereof; a blade actuator pivoted to rock about an axis parallel to the reference plane and transversely of the long axes of the blades and having a plurality of eccentrically-located pairs of spaced presser fingers, each pair flanking one of the blade contacts adjacent the contacting end portion thereof and respectively engageable with the confronting sides of the appertaining blades to flex the same responsive to rocking movement of the actuator in opposite directions; fixed contact means on the opposite sides of the contact elements of each blade contact and respectively engaged thereby in movement thereof responsive to opposite rocking of the actuator as aforesaid; and electromagnetically controlled means for effecting rocking movements of the actuator as aforesaid.

13. A relay construction according to claim 12 wherein each of said blade contacts has a laterally offset tappet area lying substantially at one side of its long axis and disposed in juxtaposition with the corresponding pair of actuator presser fingers so as to be respectively engaged thereby in opposite movement by rocking of the actuator as aforesaid; the contact elements being disposed substantially on said axis and respectively engageable with the appertaining fixed contact means responsive to deflecting movement of the blade in either direction by the actuator as aforesaid, in a manner such that initial deflection of the blade by the actuator causes initial contacting engagement of the appertaining blade contact element with the corresponding fixed contact means to establish a fulcrum for secondary blade deflecting, said actuator having a range of rocking movement to effect overtravel of the blade beyond said initial deflection, whereby to impart a secondary and changed mode of deflection thereto of a twisting character as a result of such overtravel.

14. Relay apparatus according to claim 13 wherein said laterally offset tappet area consists in an integral and outwardly angled jog in the blade away from its side margins to a point of inflection at which the first jog turns into a second jog back toward said blade axis.

15. Relay apparatus according to claim 12 wherein said means for effecting rocking movement of the actuator includes an elongated reset finger projecting from the actuator radially of its rocking axis; a reciprocable slide movable from a starting to an advanced position and back transversely of said axis in alignment with the direction of movement of said reset finger; means drivingly intercoupling said slide and reset finger unidirectionally such that movement of the slide in one direction rocks the actuator into one of its contacting positions; and spring means acting on said actuator to rock the same to its other contacting position oppositely from the action of said slide in said one direction.

16. Relay apparatus according to claim 15 wherein said intercoupling means consists of a long slot in the slide into which projects a portion of said reset finger of substantially less dimension in the direction of rocking motion than the length of said slide slot in said direction whereby the reset finger may move independently of the slide toward said other contacting position, when the slide is in a predetermined starting position.

17. Relay apparatus according to claim 15 wherein said spring means comprises a toggle torsion spring having a pair of legs with ends projecting radially outward of its torque axis and respectively engaging a fixed pivot point and a pivot point on said actuator both eccentrically of its rocking axis, the said pivot points and the torque axis of the spring lying in mutually spaced relations such that rocking of the actuator translates the spring to apply a rocking torque to the actuator which is sufficient to impart overtravel to the actuator in the spring-rocked motion thereof but reduces said torque in said direction near a terminal position of the actuator to minimize the starting load on said slide in moving the actuator in the opposite direction from said terminal position.

18. In a switching device, in combination: an array of flat contact blades clamped toward one end in a side-by-side array to project substantially in a plane with respective free end portions movable back and forth responsive to flexure of the blades in circuit-closing and opening engagement and disengagement with corresponding stationary contacts on opposite sides of said ends; a common flexing means for said blades including an elongated actuator extending crosswise of the array and mounted to oscillate in switching action in the directions of blade flexure, said actuator having presser parts aligned with each blade to engage the same on opposite sides thereof toward said free ends thereof in oscillatory switching action as aforesaid whereby to flex the blades to and from contacting engagement with their corresponding stationary contacts aforesaid; and means for effecting opposite movements of the actuator comprising a reciprocable slide movable laterally of the oscillatory axis of the actuator; means for reciprocating the slide including a solenoid having a plunger and a leverage linkage drivingly interconnecting the same with said slide; lever means extending radially of the oscillatory axis of the actuator and having loose driving coupling with said slide; whereby to move the actuator in only one of its oscillatory motions; and means for moving the actuator in the opposite oscillatory direction comprising a hairpin type spring having a helix portion with opposite end portions projecting in different directions from the center of the helix, one of said ends being pivotally connected with a member carried by the actuator and located radially of the oscillatory axis thereof; the other said spring end being pivotally connected to a member relatively stationary to the actuator and eccentric of the oscillating axis thereof, the center of the spring helix and both pivotal ends thereof lying substantially in a reference plane normal to the oscillatory axis, and each respectively on a different radius from said axis in a non-linear relationship one with respect to any of the remaining other two, in a relation such that the spring translates in position relative to said fixed end thereof in oscillatory movements of the actuator to change the spring thrust in a predetermined manner.

19. In a gang relay having a plurality of sets of opposite stationary contacts extending in a linear series, side-by-side, and a like plurality of elongated, flexible contact blades each fixed at one end in side-by-side parallel array each with a free contacting end disposed in between a set of said stationary contacts for alternate engagement therewith in first and second switching positions responsive to opposite deflections of the blade, together with an elongated actuator rockable about an axis lateral to the blades in the array and movable in opposite directions to deflect the blades simultaneously in either direction, to said first and second switching positions, improvements comprising: spring means acting on the actuator to urge the same into the first switching position; a tripping electromagnet having a latching armature movable thereby from a normal latching position to a releasing position; the actuator having latch means engageable with the armature in the normal position thereof for latching the actuator in said second switching position; means for moving the actuator from the first to the second and latched switching position, said means comprising a reciprocable reset member having a uni-directional driving connection with the actuator for moving the same from the first to the second switching position only and permitting movement of the actuator from the second back to the first switching position free of the reciprocable member; and means for reciprocating the reciprocable member including an electromagnetic solenoid having a plunger reciprocable in alignment with the reciprocable member; and a change-ratio lever system drivingly interconnecting the plunger and reciprocable member and acting to reduce the pull on the latter member as the plunger approaches a terminal position in its working movement by the solenoid.

20. In a gang relay including a plurality of contact assemblies each including a contact actuating means adapted to be moved from a reset to a tripped-out condition, resetting means comprising: a reciprocable reset member cooperative in common with all said contact actuating means and operable in one of its directions of reciprocation to move the actuating means jointly to reset condition; a solenoid having a plunger movable thereby between starting and terminal positions for driving the reciprocable member in resetting action; spring means operable to move said member in the opposite direction; and a ratio-changing linkage system drivingly interconnecting said plunger and reciprocable member and including angular lever means operable to transmit the full force of the plunger to the reciprocable member at the beginning of the resetting action, and to progressively reduce the plunger force as the latter moves toward the terminal position, and to reduce the velocity of the reciprocable member to a very low value at the completion of the resetting displacement of the reciprocable member.

References Cited

UNITED STATES PATENTS

| 1,726,391 | 8/1929 | Goff | 335—128 X |
| 2,550,242 | 4/1951 | Graybill et al. | 335—127 |

BERNARD A. GILHEANY, *Primary Examiner.*

R. N. ENVALL, JR., *Assistant Examiner.*